H. A. STILLWELL.
SHELL FEEDING MACHINE.
APPLICATION FILED MAR. 19, 1908.

941,823.

Patented Nov. 30, 1909.
5 SHEETS—SHEET 1.

WITNESSES:

INVENTOR
Howard A. Stillwell
BY
Harding & Harding
ATTORNEYS.

H. A. STILLWELL.
SHELL FEEDING MACHINE.
APPLICATION FILED MAR. 19, 1908.
941,823.
Patented Nov. 30, 1909.
5 SHEETS—SHEET 2.
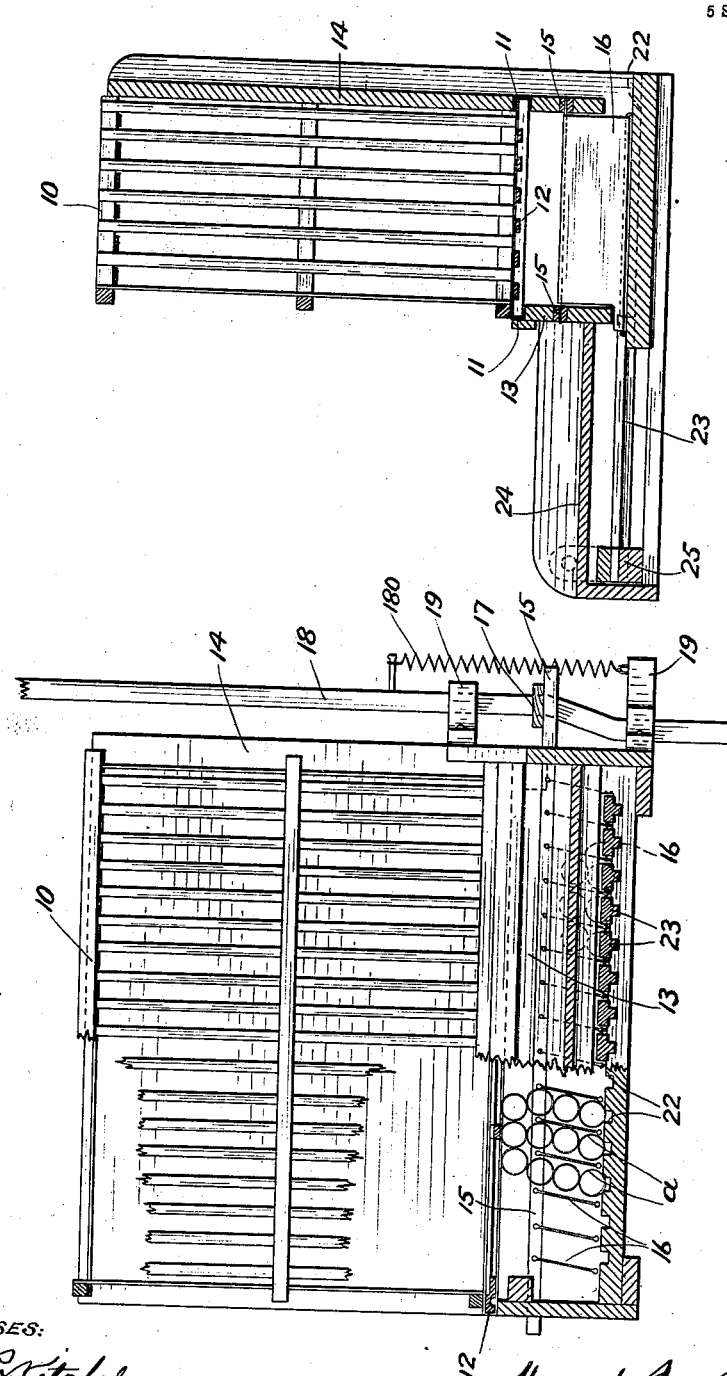

H. A. STILLWELL.
SHELL FEEDING MACHINE.
APPLICATION FILED MAR. 19, 1908.

941,823.

Patented Nov. 30, 1909.
5 SHEETS—SHEET 3.

WITNESSES:

INVENTOR
Howard A. Stillwell,
BY Harding & Harding
ATTORNEYS.

H. A. STILLWELL.
SHELL FEEDING MACHINE.
APPLICATION FILED MAR. 19, 1908.
941,823.
Patented Nov. 30, 1909.
5 SHEETS—SHEET 4.
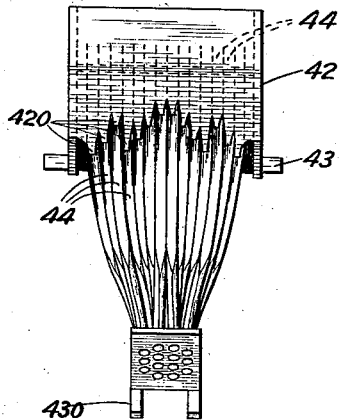
FIG. 5.
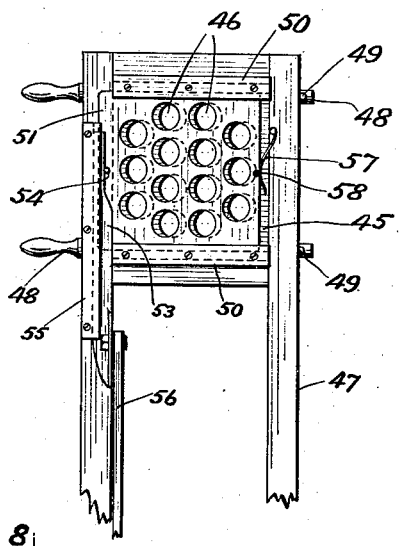
FIG. 6.
FIG. 7.
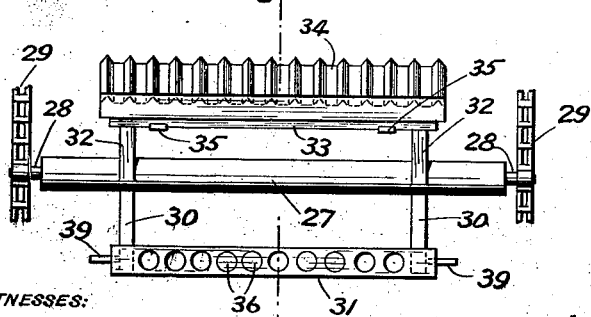
FIG. 8.
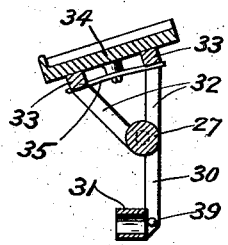
WITNESSES:
Rob R. Kitchel
E. E. Wall
INVENTOR
Howard A. Stillwell
BY
Harding & Harding
ATTORNEYS.

H. A. STILLWELL.
SHELL FEEDING MACHINE.
APPLICATION FILED MAR. 19, 1908.

941,823.

Patented Nov. 30, 1909.
5 SHEETS—SHEET 5.

WITNESSES:

INVENTOR
Howard A. Stillwell
BY
Harding Harding
ATTORNEYS.

UNITED STATES PATENT OFFICE.

HOWARD A. STILLWELL, OF WOODBURY, NEW JERSEY, ASSIGNOR TO THE E. I. DU PONT DE NEMOURS POWDER COMPANY, OF WILMINGTON, DELAWARE, A CORPORATION OF NEW JERSEY.

SHELL-FEEDING MACHINE.

941,823.  Specification of Letters Patent.  Patented Nov. 30, 1909.

Application filed March 19, 1908. Serial No. 422,180.

*To all whom it may concern:*

Be it known that I, HOWARD A. STILLWELL, a citizen of the United States, residing at Woodbury, county of Gloucester, and State of New Jersey, have invented a new and useful Improvement in Shell-Feeding Machines, of which the following is a full, clear, and exact description, reference being had to the accompanying drawings, which form a part of this specification.

The object of the invention is to provide mechanism for automatically distributing shells for explosives into shuttles adapted to hold the shells during the loading operation.

Figure 1:
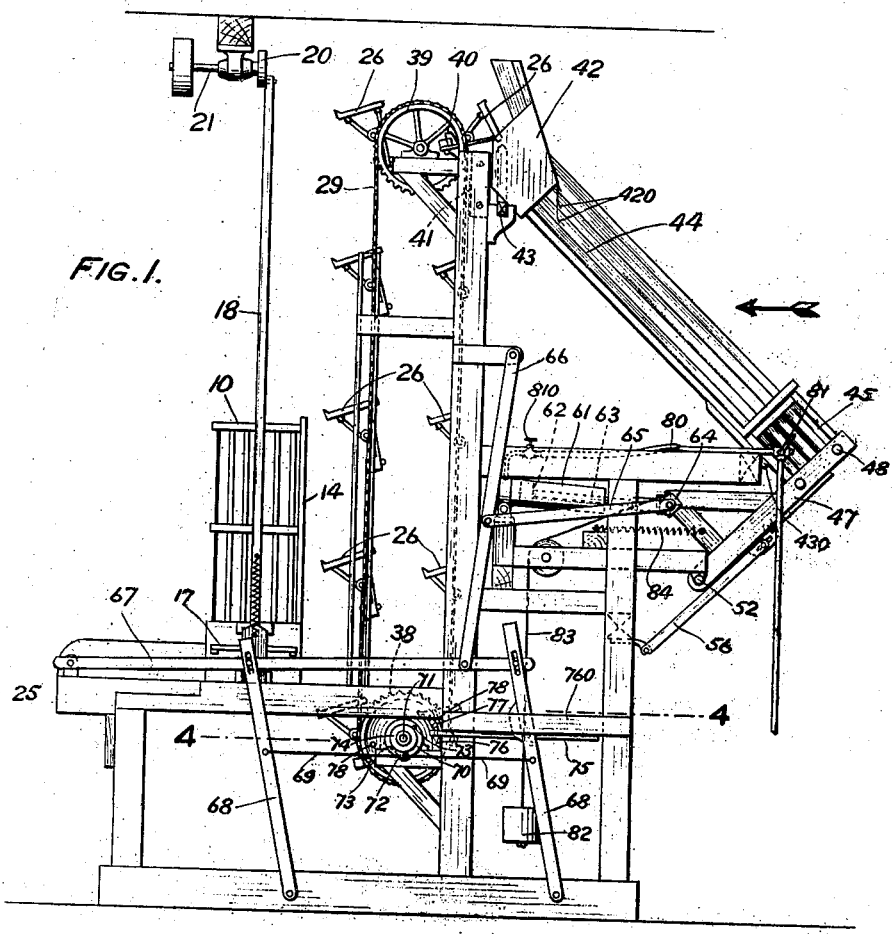
Figure 4A:
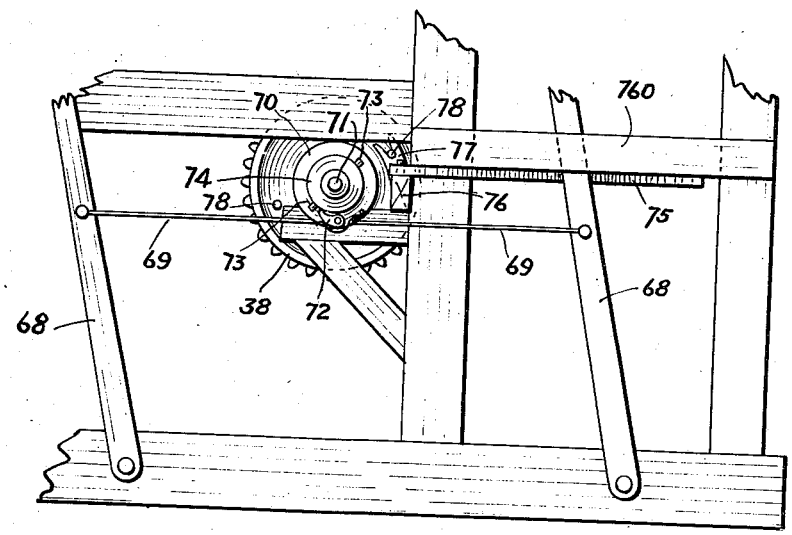
Figure 4:
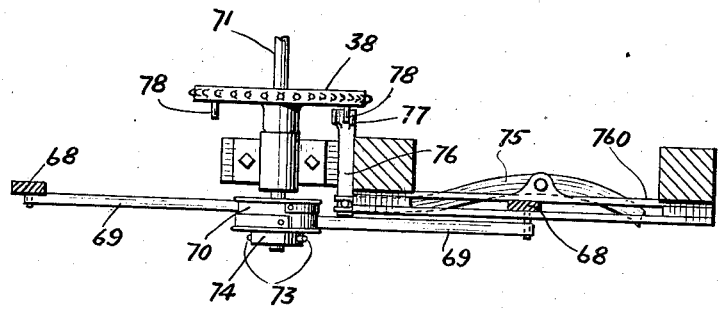
Figure 9:
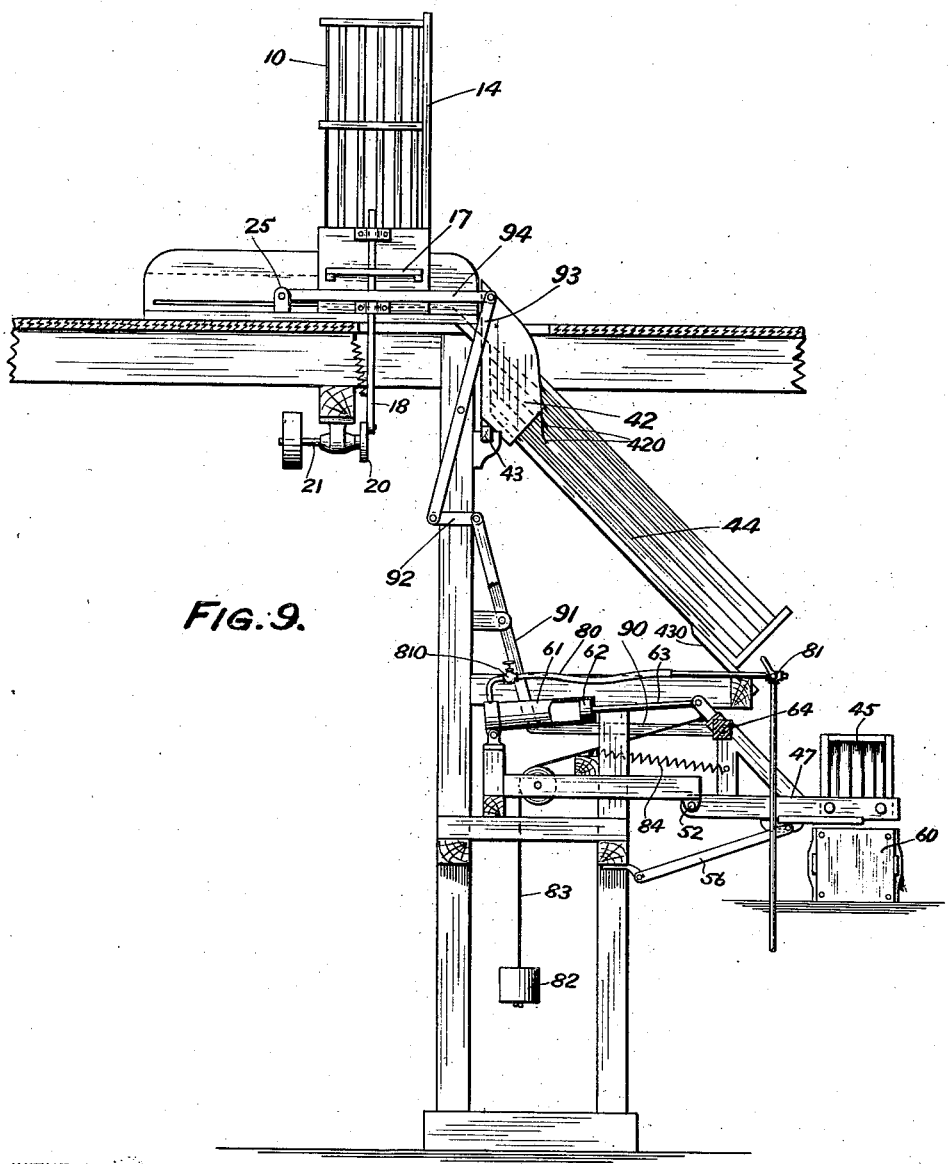

In the drawings: Figure 1 is a side elevation of the machine; Figs. 2 and 3 are detail rear and end views respectively partly in section, of the supply cage and feed box; Fig. 4 is a detail plan view of the carrier actuating mechanism on line 4—4 Fig. 1; Fig. 4ᴬ is a detail elevation of the parts shown in Fig. 4; Fig. 5 is an elevation of the conveyer for carrying the shells to the shuttles and properly distributing them therein, looking in the direction of the arrow, Fig. 1; Fig. 6 is an inverted plan view of the shuttle feeder and part of its supporting frame; Fig. 7 is a rear elevation of one of the carriers; Fig. 8 is a section on the line 8—8 of Fig. 7; Fig. 9 is a side elevation of a modified form of machine.

In the manufacture of the shells, the completed shells are fed into the cage 10, which at this time stands with its shortest side upright, the shells being fed into the cage in a vertical position. When the cage is filled it is turned into the position shown in Figs. 2 and 3 with its open top against the upwardly extended front wall 14 of the feed-box. The side of the cage which in the position illustrated is the lower side is provided with guides 11 for the sliding gate 12. The guides 11 rest respectively on the top of the rear wall 13 of the feed-box and in an inset in the front wall 14 of the feed box. After the cage 10 is thus placed upon the feed-box, the gate 12 is pulled out, permitting the shells in the cage, or a portion only of the shells if the cage be full, to drop into the feed-box. The shells are marked *a* in Fig. 2.

Extending longitudinally of the feed box through the front and rear walls thereof are the rods 15, between which are hinged the upper ends of the leaves 16, the lower ends of the leaves being hinged to the floor of the feed-box. These leaves are spaced apart a distance slightly greater than the diameter of a shell. The floor of the feed-box has the transverse grooves 22, there being a groove beneath adjacent leaves. The front ends of the rods 15 are connected by a cross bar 17, through an orifice in which extends the cam-rod 18. This cam-rod is guided in the brackets 19 secured to the feed box and is pivoted at one end to a crank pin on a disk 20 secured to a shaft 21 driven from a suitable source of power. The spring 180 connects a projection on the cam-rod with a fixed point on one of the brackets 19 and has for its function to take up lost motion between the cam-rod and its actuating mechanism.

In the rotation of the shaft 21, the cam-rod 18 is vertically reciprocated, thereby reciprocating the rods 15 and vibrating the leaves 16 on their bottom hinges. This operation automatically arranges the shells in tiers, there being one shell of a tier above each transverse groove 22.

Extending into the grooves 22 are the lower arms of the T-shaped ejecting bars 23, whose rear ends are secured to a cross-head 25 slidable back and forth within the casing 24.

By sliding the cross-head 25 forwardly, the ejectors engage the lower tier of shells and push them forwardly through an opening at the front of the feed-box onto one of the carriers 26, and a new tier of shells drops into position to be ejected as soon as the ejectors have returned to their rearward position.

The carriers 26 are shown in detail in Figs. 7 and 8. A trunnion 27 is supported at opposite ends on pins 28 on the sprocket chains 29. The trunnion 27 has the two downwardly projecting arms 30 connected together by the orificed bar 31, and the two pairs of upwardly diverging arms 32 are connected by bars 33. The receiving plate 34 of the carrier is provided with transverse grooves corresponding in number to the grooves 22 of the feed box, so that each shell, as it is delivered from the feed-box to the carrier is deposited in a definite position. The receiver 34 is removably secured to the bars 33 by means of spring arms 35 hinged centrally to the top-plate and extending under the bars 33. When it is desired to remove the receiver, the spring-arms 35 are turned from under the bars 33. The bars 31 are orificed to receive plugs 36, which may be distributed in said orifices in such manner as will secure as near as possible an even distribution of the weight and perfect balancing.

The sprocket chains 29 for driving the carrier engage the sprocket wheels 38 and 39, the lower wheels 38 being the driving wheels, which are actuated intermittently, as hereinafter described, to advance the carriers 26, after each feeding operation, a distance equal to the space between adjacent carriers, thereby presenting a fresh carrier into position to receive the next tier of shells discharged from the feed box by the ejectors 23. As the loaded carriers are carried upwardly from the feed box, they are tilted, one by one, to discharge their contents into an inclined conveyer, hereinafter described, which conveys them to a shell-holder or shuttle-feeder and at the same time distributes them so as to present them to the shuttle-feeder in proper order and arrangement, as hereinafter described.

The carriers are normally held by gravity in the position in which all of them save one are shown in Fig. 1. To cause a carrier to tilt and discharge the shell when it arrives opposite the conveyer, I provide pins 39 at the lower end of each carrier, which pins, when the carrier reaches the conveyer, engage cams 40 on the machine frame, which cams, as the carrier continues its movement, tilt the carrier into the position shown in Fig. 1. When the pin passes beyond the cam, the carrier is prevented from swinging too far in the opposite direction by contact of the pins 39 with the cams 41 secured to the main frame beneath the cams 40.

The receiving end of the conveyer, shown in detail in Fig. 5, comprises an open-ended casing 42 whose bottom is provided with grooves corresponding in number to the grooves of the receiving plate 34 of the carrier 26. The casing is supported by means of lugs 43 socketed in brackets on the main frame. Extending downwardly and forwardly are ways 44 registering with the shell receptacles 46 in the shell-holder or shuttle-feeder 45. The forward wall of the casing 42 extends downward in the form of an apron, terminating in guards 420 which overlie the respective ways 44 and confine the shells to the ways. The upper ends of the ways are open-topped, while the lowers beyond the guards 420 are of tubular form. The lower ends of the ways 44 are supported from the frame by extension 430. The shuttle-feeder (see Fig. 6) is removably secured to the side bars of the swinging frame 47 by means of rods 48 extending through said bars and the shuttle feeder and held in position by cotter pins 49. To the bottom of the shuttle-feeder are secured strips 50 forming guides in which slide the gate 51 having orifices corresponding in number and arrangement to the shell receptacles in the shuttle feeder. This gate is in the position shown in Fig. 6 when the shuttle feeder is raised against the conveyer as shown in Fig. 1; but when the frame 47 is swung down on its pivot 52 into a horizontal position, the gate slides in until the holes therein register with the receptacles 46, and the shells are then discharged from the receptacles 46 through the holes in the gate 51 into a shuttle 60 (see Fig. 9) positioned to receive them.

The sliding action of the gate is effected by means of a cam slide 53 engaging a pin 54 on the gate. The cam-slide is guided by a strip 55 secured to the frame 47 and is connected to a rod 56 pivoted on the main frame. As the frame 47 swings down, it approaches the pivot of rod 56, thus imparting to the latter and slide 53 a forward movement relative to the gate, the cam portion of slide 53 engaging the pin as the frame 47 reaches its lowest position, thereby sliding the gate as described. When the frame 47 is raised, a spring 57 thereon engages a pin 58 on the gate and returns it to its closed position.

To impart to the various parts the movements described in the proper sequence, I have provided mechanism actuated from a pressure fluid cylinder 61 pivoted on the main frame. The rod 63 of the plunger 62 of this cylinder is connected to a cross-head 64. To this cross-head is attached the swinging frame 47 and also the links 65, one on each side of the machine. Each link 65 is attached to a lever 66 pivoted at its upper end to a bracket on the main frame and at its lower end to a rod 67, which is attached at its rear end to the cross-head 25' that actuates the ejectors 23.

Pivoted to the base of the frame at one side thereof are levers 68 whose upper ends have a pin and slot connection with the corresponding lever 67. To each lever 68 is connected a strap 69 passing in opposite directions part way around, and secured to, a pulley 70 loose on the shaft 71, to which the sprocket wheels 38 are secured. The pulley 70 carries a spring-pressed pawl 72 adapted to successively engage pins 73 on a disk 74 secured to the shaft 71. It will be understood that as the pulley 70 is turned in one direction by means of one of the straps 69, the pawl 72 drops behind one of the pins 73, and the pulley is turned in the other direction by means of the other strap 69, the pawl engages such pin and turns the shaft 71 a half-revolution; thereby advancing the sprocket chains and the carriers suspended therefrom as before described.

In order that the carrier mechanism shall not move beyond the point to which it is positively moved by the pawl 72, the following mechanism is provided (see Figs. 1 and 4): A cam lever 75 is pivoted on a guide 760 secured to the main frame. One of the levers 68, slides in this guide and engages the lever 75 at each movement for advancing the carrier and moves the rear end of the lever inwardly. The rear end of the lever is forked to engage a pin on the outer end of a slide-bar 76. The inner end of the slide-bar is provided with upwardly extending fingers forming between them a socket 77 in line with pins 78 on the adjacent sprocket wheel 38. The slide-bar 76 is moved to its inner operative position before the carrier actuating movement is completed and one of the pins 78 bottoms in the socket 77 when the pawl has reached the end of its stroke. In the return movement of the lever 68, the lever 75 is moved to retract the slide-bar 76.

The pressure cylinder 61 is connected with the source of power by means of a pipe 80 controlled by a three-way valve 81 and a throttle valve 810. When the valve is turned into one position, pressure is admitted to the cylinder, whereupon the plunger is moved forwardly. In this movement of the plunger, the ejectors 23 eject a tier of shells from the feed box into the carrier positioned to receive them and the shuttle feeder 45 is swung down and its contents discharged into the shuttle 60. In this movement of the plunger 62, the carrier is not operated. When the valve 81 is moved to connect the cylinder 61 with the exhaust, the weight 82, connected by a cord 83 with the cross-head 64, and the spring connecting the shuttle feeder frame with the machine frame returns the plunger 62, elevates the shuttle-feeder 45, retracts the ejectors 23, and advances the carriers, one of which discharges its contents into the inclined conveyer 42—44 as the shuttle feeder is brought into registration therewith.

The machine above described is designed with a view of having all the mechanism on a single floor. This is ordinarily highly desirable. In cases where there is no serious objection to the location of the feed-box on an upper floor, the intermediate carriers may be dispensed with and the shells ejected from the feed-box directly onto the inclined conveyer. Such an arrangement is illustrated in Fig. 9. In this figure the carriers and their actuating mechanism are omitted and the cross-head 25 of the ejectors 23 is reciprocated from the cross-head 64 through the medium of link 90, intermediately pivoted lever 91, link 92, intermediately pivoted lever 93, and connecting rod 94. The construction in other respects being the same as that of Fig. 1, the same reference letters are employed to illustrate like parts.

Mechanism for automatically loading shells carried in shuttles arranged to turn about a vertical axis is well known in the art, and the machine herein described is adapted for use in connection with such a shell loading machine without any substantial change in the latter's construction. There is therefore no occasion to describe in this specification any mechanism for automatically presenting the shuttles to the shuttle feeder.

Having now fully described my invention, what I claim and desire to protect by Letters Patent is:

1. In a shell-feeding machine, in combination, a feed-box, a shuttle feeder, means to eject the shells from the feed box, means to convey them to the shuttle feeder, and means to move the shuttle feeder into and out of operative relation with said conveying means and to discharge the shells.

2. In a shell feeding machine, in combination, a feed-box, ejectors adapted to eject the shells from the feed-box, traveling carriers adapted to receive the shells so ejected, a shell-holder, and a conveyer adapted to receive the shells from the carriers and convey them to the shell-holder.

3. In a shell feeding machine, in combination, a feed-box, ejectors adapted to eject the shells from the feed box, traveling carriers adapted to receive the shells so ejected, a shuttle feeder, a conveyer adapted to receive the shells from the carriers and convey them to the shuttle feeder, and means to move the shuttle feeder into and out of operative relation with the conveyer and to discharge the shells.

4. In a shell feeding machine, in combination, a feed-box, means therein for arranging the shells in tiers, ejectors adapted to eject the shells from the feed-box, one tier at a time, vertically traveling carriers upon which the shells are discharged from the feed box, an inclined conveyer to which the shells are discharged from the carrier, a shuttle feeder to which the shells are conveyed by the conveyer, and means to move the shuttle-feeder into and out of operative relation with the conveyer and to discharge the shells.

5. In a shell feeding machine, in combination, a feed box, means for arranging the shells therein in vertical rows and horizontal tiers, and ejectors, one for each vertical row, adapted to eject the shells from the feed box one tier at a time.

6. In a shell feeding machine, in combination, a feed box, means for arranging the shells therein in vertical rows and horizontal tiers, said box having in its floor grooves along and over which the lower tier of shells is adapted to rest, and ejectors adapted to slide in said grooves and thereby eject the shells from the box.

7. In a shell feeding machine, in combination, a feed box, means for arranging the shells therein in vertical rows and horizontal tiers, said box having in its floor grooves, the shells being adapted to extend longitudinally of said grooves and project therein below the plane of the box floor, and shell ejectors adapted to slide in said grooves and project above the plane of the box-floor.

8. In a shell feeding machine, in combination, a feed box, leaves therein adapted to divide the shells into vertical rows, and reciprocatory ejectors, arranged in the same horizontal plane, adapted to work between the leaves and at each reciprocation expel the lowermost shell of each vertical row from the feed-box.

9. In a shell feeding machine, in combination, a feed box, leaves therein and means to vibrate the leaves, whereby the shells are divided into vertical rows, and ejectors adapted to engage and remove the lowermost tier of shells.

10. In a shell feeding machine, in combination, a feed box, leaves therein adapted to divide the shells into vertical rows, said leaves being hinged at their lower ends, rods extending transversely of the leaves and to which said leaves are pivoted, and means to reciprocate the rods.

11. In a shell feeding machine, in combination, a feed box, leaves therein adapted to divide the shells into vertical rows, said leaves being hinged at their lower ends, rods extending transversely of the leaves and to which said leaves are pivoted, a cross bar connecting outer ends of said rods, a cam rod extending through an orifice in said cross-bar, and means to reciprocate the cam rod.

12. In a shell feeding machine, in combination, a feed box, a wall extending above one side thereof, a cage, open at one side through which it may be filled, having a removable bottom, said cage being adapted to be placed with its removable bottom overlying the feed box and its open side against said wall.

13. In a shell feeding machine, in combination, a cage open at one side and having guides in its bottom, a gate slidable in said guides, a feed box on which the bottom of the cage is adapted to rest, and a wall fixed in relation to the feed-box against which the open side of the cage is adapted to rest.

14. In a shell feeding machine, in combination, a feed box adapted to contain shells, ejectors adapted to discharge the shells from the box, carriers, a traveling support for the carriers on which the carriers are supported, a conveyer adapted to receive the shells from the carrier, and means adapted to effect the discharge of the shells carried by the carrier onto the conveyer.

15. In a shell feeding machine, in combination, carriers, means to deposit shells thereon, a traveling support for said carriers, means to move said support step by step to bring said carriers successively into operative relation with the shell-depositing means, a stop adapted to arrest the movement of said support after it has moved a predetermined distance, means, operated by the carrier support actuating means, to move said stop into and out of the path of travel of said support, and a shell holder adapted to receive the shells carried by the carriers.

16. In a shell feeding machine, in combination, a carrier frame comprising longitudinally extending bars, a shell receiving plate adapted to rest thereon, and spring arms pivoted to the plate and adapted to be turned to underlie said bars whereby the plate is removably secured to its frame.

17. In a shell feeding machine, in combination, a traveling carrier support, pins thereon, trunnions, each supported at opposite ends on two of said pins, downwardly projecting weighted arms on said trunnions, two pairs of upwardly projecting arms on each trunnion, bars connecting said pairs of arms, and a receiving plate removably supported on said bars.

18. In a shell feeding machine, in combination, a traveling carrier support, carrier frames pivoted thereon, a carrier secured to each frame on one side of the latter's pivot, an orificed bar secured to the carrier frame on the other side of its pivot, and weights removably held in said orifices.

19. In a shell feeding machine, in combination, a feed box, ejectors adapted to discharge shells therefrom, carriers onto which the shells so discharged are deposited, a traveling support on which the carriers are sustained, reciprocating devices acting respectively upon the ejectors to reciprocate them and upon the carrier support to advance it step by step, and common actuating means for said reciprocating devices.

20. In a shell feeding machine, in combination, carriers, means to deposit shells thereon, a traveling support for said carriers, means to move said support step by step to bring said carriers successively into operative relation with the shell-depositing means, a slide bar, a socket carried thereby, a pin on the carrier support adapted to enter said socket when the slide bar is in advanced position, and means, operated by the carrier support actuating means, to advance and retract said slide bar.

21. In a shell feeding machine, in combination, carriers, means to deposit shells thereon, a traveling support for said carriers, means to move said support step by step to bring said carriers successively into operative relation with the shell-depositing means, a slide bar, a socket carried thereby, a pin on the carrier support adapted to enter said socket when the slide bar is in advanced position, a lever pivoted to the slide bar, and a lever moving with the carrier support actuating means adapted to engage said lever and turn it on its pivot to actuate said slide bar.

22. In a shell feeding mechanism, in combination, horizontal shafts, a pair of sprocket wheels on each shaft, two sprocket chains one engaging a wheel of each pair, carriers suspended between said chains, means to turn one of said shafts intermittently, a pin turning with one of the wheels on the driven shaft, a slide bar, a socket thereon, a pivoted lever engaging the slide bar, and means to turn said lever on its pivot, thereby moving said slide-bar to bring said socket in line of travel of said pin.

23. In a shell feeding machine, in combination, a shell holder containing shell receptacles, a feed box, means to arrange the shells therein in tiers, inclined ways whose lower ends register with said receptacles and whose upper ends are arranged in the same horizontal plane, means to convey the shells tier by tier from the feed box to the upper ends of said ways, whereby the shells are rearranged and guided to said receptacles.

24. In a shell feeding machine, in combination, a shell holder containing shell receptacles, a feed box, means to arrange the shells therein in tiers, inclined ways whose lower ends register with said receptacles and whose upper ends are arranged in the same horizontal plane, means to eject the shells from the feed box tier by tier, carriers having grooved receiving plates adapted to receive the shells so ejected, and means to discharge the shells from the carriers to the upper ends of said ways.

25. In a shell feeding machine, in combination, a shuttle feeder containing shell receptacles and pivotally connected with the machine frame, means to convey shells thereto when the shuttle feeder is swung into one position, a sliding gate at the lower end of said shuttle feeder containing holes adapted to register with said receptacles, a slide adapted to actuate said gate and also pivotally connected to the frame, whereby when the shuttle-feeder is swung on its pivot said gate is moved to bring its holes into register with said receptacles.

26. In a shuttle feeding machine, in combination, inclined shell ways, means to convey shells to the upper ends thereof, a shuttle feeder, means to move said shuttle feeder toward and from said ways, said shuttle feeder containing shell receptacles adapted in the movement of the shuttle feeder to be brought into and out of register with the lower ends of said ways, a movable gate containing holes adapted to register with said receptacles, and means to impart to said gate a movement in relation to said shuttle feeder in the latter's movement, whereby the shells are held in their receptacles except when the shuttle feeder is moved away from said ways.

27. In a shuttle feeding machine, in combination, inclined shell ways, means to convey shells to the upper ends thereof, a movable shuttle feeder containing shell receptacles adapted in the movement of the shuttle feeder to be brought into and out of register with the lower ends of said ways, a movable gate containing holes adapted to register with said receptacles, and means adapted to simultaneously move said shuttle feeder in relation to said ways and said gate in relation to said shuttle feeder, whereby the shells are free to escape from their receptacles when the shuttle feeder has been moved away from said ways.

28. In a shuttle feeding machine, in combination, a feed box, ejectors adapted to feed the shells therefrom, a movable shuttle-feeder adapted to receive said shells, means between the ejectors and the shuttle-feeder to convey the shells to the latter, a motor, and connections therefrom to, and adapted to actuate, the shuttle-feeder and ejectors.

29. In a shuttle feeding machine, in combination, a feed box, ejectors adapted to feed the shells therefrom, carriers adapted to receive and discharge the ejected shells, a traveling carrier support, inclined shell ways adapted to receive the shells from the carriers, a shuttle feeder movable into and out of register with the movable ways, a motor, and connections therefrom actuating the shuttle-feeder, ejectors and carrier support.

30. In a shuttle feeding machine, in combination, a feed box, ejectors adapted to feed the shells therefrom, carriers adapted to receive and discharge the ejected shells, a traveling carrier support, a shell holder adapted to receive the shells discharged from the carriers, a motor, and connections therefrom actuating the ejectors and carrier support.

31. In a shuttle feeding machine, in combination, a feed box, ejectors adapted to feed the shells therefrom, carriers adapted to receive and discharge the ejected shells, a traveling carrier support, a shell holder adapted to receive the shells discharged from the carriers, a reciprocating rod actuating the ejectors, connections from said rod actuating the carrier support, a motor, and connections therefrom actuating said rod.

32. In a shell feeding machine, in combination, a feed-box, inclined shell-conveying ways covered at their lower ends and open topped at their upper ends, means to convey the shells from the feed box to the upper ends of said ways, and an apron overlying the upper ends of said ways and having end guides extending toward and terminating above the covered sections of said ways.

In testimony of which invention, I have hereunto set my hand, at Woodbury, New Jersey, on this tenth day of March, 1908.

HOWARD A. STILLWELL.

Witnesses:
EDWARD P. HENRY,
DAVID O. WATKINS.